US00RE48152E

(19) United States
(12) Reissued Patent
Plate

(10) Patent Number: US RE48,152 E
(45) Date of Reissued Patent: Aug. 11, 2020

(54) MAGAZINE LOADER

(71) Applicant: PLATE, LLC, Fort Myers, FL (US)

(72) Inventor: Christopher Andrew Plate, Cape Coral, FL (US)

(73) Assignee: PLATE LLC, Cape Coral, FL (US)

(21) Appl. No.: 16/653,535

(22) Filed: Oct. 15, 2019

Related U.S. Patent Documents

Reissue of:
(64) Patent No.: 9,739,552
Issued: Aug. 22, 2017
Appl. No.: 15/598,164
Filed: May 17, 2017

U.S. Applications:
(63) Continuation of application No. 15/294,770, filed on Oct. 16, 2016, now Pat. No. 9,689,633, which is a continuation-in-part of application No. 14/979,051, filed on Dec. 22, 2015, now Pat. No. 9,618,286, which is a continuation-in-part of application No. 14/869,502, filed on Sep. 29, 2015, now abandoned.

(60) Provisional application No. 62/473,994, filed on Mar. 20, 2017, provisional application No. 62/478,090, filed on Mar. 29, 2017.

(51) Int. Cl.
*F41A 9/82* (2006.01)
*F41A 9/83* (2006.01)

(52) U.S. Cl.
CPC ..... *F41A 9/83* (2013.01)

(58) Field of Classification Search
CPC combination set(s) only.
See application file for complete search history.

(56) References Cited

U.S. PATENT DOCUMENTS 447,577 A 3/1891 Milanovitch-Koka
581,296 A 4/1897 Von Mannlicher
2,403,012 A * 7/1946 McPheters ..... F41A 9/83 42/87
4,352,254 A * 10/1982 Peter ..... F41A 9/83 42/88
4,392,321 A 7/1983 Bosworth
(Continued)

FOREIGN PATENT DOCUMENTS

DE 3016836 A1 2/1980
DE 3634119 A1 * 4/1988 ..... F41A 9/83
(Continued)

OTHER PUBLICATIONS

Unknown Author, Magazine Loaders for B&T MP9 and HK MP5, Sep. 3, 2015 or earlier, Александр Сергеевич, https://www.youtube.com/watch?v=himrMwJ7gn8.
(Continued)

*Primary Examiner* — Jeffrey R Jastrzab
(74) *Attorney, Agent, or Firm* — George F. Wallace

(57) ABSTRACT

An ammunition magazine loader include a main body, a rounds recess, a rounds abutment, and a magazine recess. Rounds are provided to the rounds recess and positionally maintained by a rounds recess bottom and first and second rounds recess ledges. With a magazine positioned within the magazine recess and rounds within the rounds recess, as the rounds are slidably moved out of the rounds recess, each round abuts the rounds abutment and pivots to orient the round such that its second case end is angled towards the magazine recess.

21 Claims, 8 Drawing Sheets

(56) References Cited

U.S. PATENT DOCUMENTS

| | | | | |
|---|---|---|---|---|
| 4,509,284 | A | 4/1985 | Naber | |
| 4,538,371 | A | 9/1985 | Howard | |
| 4,570,371 | A | 2/1986 | Mears | |
| 4,574,511 | A | 3/1986 | Csongor | |
| 4,632,011 | A | 12/1986 | Metz et al. | |
| 4,690,031 | A | 9/1987 | Metz et al. | |
| 4,706,402 | A * | 11/1987 | Csongor | F41A 9/83 42/87 |
| 4,736,667 | A | 4/1988 | Kochevar et al. | |
| 4,739,572 | A | 4/1988 | Brandenburg | |
| 4,756,110 | A | 7/1988 | Beltron | |
| 4,879,829 | A | 11/1989 | Miller et al. | |
| 4,905,394 | A | 3/1990 | Predazzer | |
| 4,939,862 | A | 7/1990 | Brandenburg et al. | |
| 4,967,723 | A | 11/1990 | Cutrell | |
| 5,319,872 | A | 6/1994 | Bammate | |
| 5,402,594 | A | 4/1995 | Switzer | |
| 6,754,987 | B1 | 6/2004 | Cheng et al. | |
| 6,810,616 | B2 | 11/2004 | Tal et al. | |
| 6,817,133 | B1 | 11/2004 | Williams | |
| 7,059,077 | B2 | 6/2006 | Tal et al. | |
| 7,257,919 | B1 | 8/2007 | Farley | |
| 7,383,657 | B2 | 6/2008 | Pikielny | |
| 7,487,613 | B2 | 2/2009 | Taylor | |
| 7,503,138 | B2 | 3/2009 | Tal et al. | |
| 7,637,048 | B2 | 12/2009 | Tal et al. | |
| 7,805,874 | B2 | 10/2010 | Tal et al. | |
| 7,866,080 | B2 | 1/2011 | Tucker | |
| 8,356,441 | B2 | 1/2013 | Meinel | |
| 8,453,366 | B2 | 6/2013 | Gray | |
| 8,469,014 | B2 | 6/2013 | Hu | |
| 8,650,792 | B1 | 2/2014 | Overmars | |
| 8,915,007 | B1 | 12/2014 | Williams | |
| 8,931,199 | B1 | 1/2015 | Cauley, Jr. et al. | |
| D728,065 | S | 4/2015 | Tal et al. | |
| 9,003,687 | B2 | 4/2015 | Cauley, Jr. et al. | |
| 9,057,570 | B1 | 6/2015 | Tal et al. | |
| 9,212,859 | B1 | 12/2015 | Tal et al. | |
| 10,254,061 | B1 | 4/2019 | Loveday, IV et al. | |
| 10,317,154 | B1 | 6/2019 | Loveday, IV et al. | |
| 10,612,873 | B1 * | 4/2020 | Witecha | F41A 9/84 |
| 2003/0046854 | A1 | 3/2003 | Urchek | |
| 2004/0020096 | A1 | 2/2004 | Tal et al. | |
| 2004/0159035 | A1 * | 8/2004 | Newman | F41A 9/83 42/87 |
| 2005/0081421 | A1 | 4/2005 | Guy et al. | |
| 2007/0017140 | A1 | 1/2007 | Pikeilny | |
| 2007/0107291 | A1 | 5/2007 | Tal et al. | |
| 2008/0184608 | A1 | 8/2008 | Tal et al. | |
| 2008/0184698 | A1 | 8/2008 | Tal et al. | |
| 2008/0244952 | A1 | 10/2008 | Taylor | |
| 2009/0044440 | A1 | 2/2009 | Tal et al. | |
| 2010/0175294 | A1 | 7/2010 | Meinel | |
| 2010/0313460 | A1 | 12/2010 | Tucker | |
| 2012/0060810 | A1 | 3/2012 | Hu | |
| 2013/0067788 | A1 | 3/2013 | Gray | |
| 2013/0192117 | A1 | 8/2013 | Meinel | |
| 2013/0232843 | A1 | 9/2013 | Bajuelo | |
| 2014/0033592 | A1 | 2/2014 | Fiorucci | |
| 2014/0298704 | A1 | 10/2014 | Niccum | |
| 2014/0311008 | A1 | 10/2014 | McPhee | |
| 2014/0317985 | A1 | 10/2014 | Cauley, Jr. et al. | |
| 2015/0007480 | A1 | 1/2015 | Cauley, Jr. et al. | |
| 2015/0027023 | A1 | 1/2015 | Michael et al. | |
| 2015/0219415 | A1 | 8/2015 | Cauley, Jr. et al. | |
| 2015/0377573 | A1 | 12/2015 | Niccum | |
| 2016/0025437 | A1 * | 1/2016 | Slocum | F41A 9/83 42/87 |
| 2017/0051991 | A1 | 2/2017 | Cottrell et al. | |
| 2017/0051992 | A1 | 2/2017 | Cottrell et al. | |

FOREIGN PATENT DOCUMENTS

| | | | | |
|---|---|---|---|---|
| EP | 0205661 | A2 | 12/1986 | |
| IL | EP 0205661 | A2 * | 12/1986 | F41A 9/83 |

OTHER PUBLICATIONS

Ray I, SmitLoad Glock Mag Loader, Apr. 21, 2016 or earlier, The Firearm Blog, https://www.thefirearmblog.com/blog/2016/04/211225273/.

Defendant's Answer, Defenses, and Counterclaims to Plaintiffs Amended Complaint; *Plate, LLC* v. *Rctenn, LLC*, United States District Court Middle District of Tennessee, Case No. 3:18-cv-806; Feb. 19, 2019.

Defendants' Answer, Defenses, and Counterclaims to Re-Filed Fourth Amended Complaint; *Plate, LLC and Christopher Plate* v. *Elite Tactical Systems, LLC, et al.*, United States District Court Eastern District of Tennessee, Case No. 3:18-cv-265; Sep. 17, 2019.

Defendant's Memorandum in Support of Motion for Summary Judgment; *Plate, LLC* v. *Rctenn, LLC*, United States District Court Middle District of Tennessee, Case No. 3:18-cv-806; Jan. 17, 2020.

Defendant's Reply Brief in Support of Motion of Summary Judgment; *Plate, LLC* v. *Rctenn, LLC*, United States District Court Middle District of Tennessee, Case No. 3:18-cv-806; Feb. 28, 2020.

Motion to Continue Hearing; *Plate, LLC and Christopher Plate* v. *Elite Tactical Systems, LLC, et al.*, United States District Court Eastern District of Tennessee, Case No. 3:18-cv-265; Jul. 12, 2018.

Response to Plaintiff's Motion for a Preliminary Injunction; *Plate, LLC and Christopher Plate* v. *Elite Tactical Systems, LLC, et al.*, United States District Court Eastern District of Tennessee, Case No. 3:18-cv-265; Jul. 20, 2018.

Defendants' Answer, Defenses, and Counterclaims to Second Amended Complaint; *Plate, LLC and Christopher Plate* v. *Elite Tactical Systems, LLC, et al.*, United States District Court Eastern District of Tennessee, Case No. 3:18-cv-265; Aug. 30, 2018.

Defendants' First Amended Answer, Defenses, and Counterclaims to Second Amended Complaint; *Plate, LLC and Christopher Plate* v. *Elite Tactical Systems, LLC, et al.*, United States District Court Eastern District of Tennessee, Case No. 3:18-cv-265; Sep. 20, 2018.

Defendants' Answer, Defenses, and Counterclaims to Third Amended Complaint; *Plate, LLC and Christopher Plate* v. *Elite Tactical Systems, LLC, et al.*, United States District Court Eastern District of Tennessee, Case No. 3:18-cv-265; Feb. 13, 2019.

Defendants' Amended Answer, Defenses, and Counterclaims to Third Amended Complaint; *Plate, LLC and Christopher Plate* v. *Elite Tactical Systems, LLC, et al.*, United States District Court Eastern District of Tennessee, Case No. 3:18-cv-265; Mar. 6, 2019.

Defendants' Opening Claim Construction Brief; *Plate, LLC and Christopher Plate* v. *Elite Tactical Systems, LLC, et al.*, United States District Court Eastern District of Tennessee, Case No. 3:18-cv-265; *Plate, LLC* v. *Rctenn, LLC*, United States District Court Middle District of Tennessee, Case No. 3:18-cv-806; Apr. 5, 2019.

Defendants' Responsive Claim Construction Brief; *Plate, LLC and Christopher Plate* v. *Elite Tactical Systems, LLC, et al.*, United States District Court Eastern District of Tennessee, Case No. 3:18-cv-265; *Plate, LLC* v. *Rctenn, LLC*, United States District Court Middle District of Tennessee, Case No. 3:18-cv-806; May 3, 2019.

Defendants' Response to Plaintiff's Rule 15 Motion for Leave to File Fourth Amended Complaint; *Plate, LLC and Christopher Plate* v. *Elite Tactical Systems, LLC, et al.*, United States District Court Eastern District of Tennessee, Case No. 3:18-cv-265; Jul. 15, 2019.

Motion; *Plate, LLC and Christopher Plate* v. *Elite Tactical Systems, LLC, et al.*, United States District Court Eastern District of Tennessee, Case No. 3:18-cv-265; Jul. 25, 2019.

Defendants' Answer, Defenses, and Counterclaims to Fourth Amended Complaint *Plate, LLC and Christopher Plate* v. *Elite Tactical Systems, LLC, et al.*, United States District Court Eastern District of Tennessee, Case No. 3:18-cv-265; Aug. 15, 2019.

(56) References Cited

OTHER PUBLICATIONS

Defendants' Response to Plaintiffs' Motion to Compel; *Plate, LLC and Christopher Plate* v. *Elite Tactical Systems, LLC, et al.*, United States District Court Eastern District of Tennessee, Case No. 3:18-cv-265; Jan. 17, 2020.
Response to Plaintiffs' Motion to Exclude Derek Watkins; *Plate, LLC and Christopher Plate* v. *Elite Tactical Systems, LLC, et al.*, United States District Court Eastern District of Tennessee, Case No. 3:18-cv-265; Jan. 24, 2020.
Defendants' Response to Plaintiffs' Motion for Limited Purpose Extension to Pleading Amendment Deadline; *Plate, LLC and Christopher Plate* v. *Elite Tactical Systems, LLC, et al.*, United States District Court Eastern District of Tennessee, Case No. 3:18-cv-265; Mar. 12, 2020.
Defendants' Response in Opposition to Plaintiffs' Rule 15 Motion for Leave to File Fifth Amended Complaint; *Plate, LLC and Christopher Plate* v. *Elite Tactical Systems, LLC, et al.*, United States District Court Eastern District of Tennessee, Case No. 3:18-cv-265; Apr. 28, 2020.
Defendants' Motion to Continue Claim Construction Proceedings and to Stay the Case; *Plate, LLC and Christopher Plate* v. *Elite Tactical Systems, LLC, et al.*, United States District Court Eastern District of Tennessee, Case No. 3:18-cv-265; Apr. 28, 2020.
Defendant's Answer, Defenses, and Counterclaims to Plaintiffs Complaint; *Plate, LLC* v. *Rctenn, LLC*, United States District Court Middle District of Tennessee, Case No. 3:18-cv-806; Sep. 27, 2018.
Defendant's Motion to Stay; *Plate, LLC* v. *Rctenn, LLC*, United States District Court Middle District of Tennessee, Case No. 3:18-cv-806; Oct. 5, 2018.
Defendant's Memorandum in Support of Motion to Stay; *Plate, LLC* v. *Rctenn, LLC*, United States District Court Middle District of Tennessee, Case No. 3:18-cv-806; Oct. 5, 2018.
Defendant's Reply Brief in Support of its Motion to Stay; *Plate, LLC* v. *Rctenn, LLC*, United States District Court Middle District of Tennessee, Case No. 3:18-cv-806; Nov. 16, 2018.
Amended Certificate of Service; *Plate, LLC* v. *Rctenn, LLC*, United States District Court Middle District of Tennessee, Case No. 3:18-cv-806; Feb. 21, 2019.
Defendant's Motion for Leave to File Summary Judgement Briefs in Excess Page Limits Under Local Rules; *Plate, LLC* v. *Rctenn, LLC*, United States District Court Middle District of Tennessee, Case No. 3:18-cv-806; Jan. 3, 2020.
Motion for Leave to File Under Seal; *Plate, LLC* v. *Rctenn, LLC*, United States District Court Middle District of Tennessee, Case No. 3:18-cv-806; Jan. 10, 2020.
Motion to Exclude Expert Opinion Testimony of Dr. Grune; *Plate, LLC* v. *Rctenn, LLC*, United States District Court Middle District of Tennessee, Case No. 3:18-cv-806; Jan. 10, 2020.
Memorandum in Support of Motion to Exclude Expert Opinion Testimony of Dr. Grune; *Plate, LLC* v. *Rctenn, LLC*, United States District Court Middle District of Tennessee, Case No. 3:18-cv-806; Jan. 10, 2020.
Defendant's Motion for Summary Judgment; *Plate, LLC* v. *Rctenn, LLC*, United States District Court Middle District of Tennessee, Case No. 3:18-cv-806; Jan. 17, 2020.
Defendant's Statement of Undisputed Material Facts in Support of Motion for Summary Judgment; *Plate, LLC* v. *Rctenn, LLC*, United States District Court Middle District of Tennessee, Case No. 3:18-cv-806; Jan. 17, 2020.
Defendant's Unopposed Motion for Leave to File Reply Brief with Excess Pages; *Plate, LLC* v. *Rctenn, LLC*, United States District Court Middle District of Tennessee, Case No. 3:18-cv-806; Jan. 29, 2020.
Defendant's Reply in Support of Motion to Exclude Expert Opinion Testimony of Dr. Guerry Grune; *Plate, LLC* v. *Rctenn, LLC*, United States District Court Middle District of Tennessee, Case No. 3:18-cv-806; Jan. 31, 2020.
Defendant's Response in Opposition to Plaintiff's Motion for Partial Summary Judgment; *Plate, LLC* v. *Rctenn, LLC*, United States District Court Middle District of Tennessee, Case No. 3:18-cv-806; Feb. 14, 2020.
Defendant's Response to Plaintiff's Statement of Undisputed Material Facts; *Plate, LLC* v. *Rctenn, LLC*, United States District Court Middle District of Tennessee, Case No. 3:18-cv-806; Feb. 14, 2020.
Defendant's Reply Statement of Undisputed Material Facts in Support of Motion for Summary Judgment; *Plate, LLC* v. *Rctenn, LLC*, United States District Court Middle District of Tennessee, Case No. 3:18-cv-806; Feb. 28, 2020.
Defendant's Motion for Leave to File Supplemental Brief in Support of Motion for Summary Judgment; *Plate, LLC* v. *Rctenn, LLC*, United States District Court Middle District of Tennessee, Case No. 3:18-cv-806; Apr. 22, 2020.
Defendant's Response to Plaintiff's Emergency Motion to Dissolve Protective Order and Unseal All Filings; *Plate, LLC* v. *Rctenn, LLC*, United States District Court Middle District of Tennessee, Case No. 3:18-cv-806; Jun. 6, 2020.
Unknown Author, Magazine Loaders for B&T MF9 and HK MP5, Sep. 3, 2015, Александр Сергеевич , https://www.youtube.com/watch?v=himrMwJ7gn8.
Unknown Author, So the cats out of the bag., Dec. 23, 2016, etsgroup, https://www.instagram.com/p/BOXrixQjfBT/.
Unknown Author, Custom AR-15 Magazine Loader Mar. 27, 2016, Buck Shot Sporting Goods, https://gun.deals/product/custom-ar-15-magazine-loader-wooden-cnc-usa-made-free-ship-no-cc-fee-150.
Unknown Author, AR-15, 30 Round Magazine Speed Loader, Nov. 26, 2015, PopsCabinetShop, https://www.etsy,com/listing/239467167/ar-15-30-round-magazine-speed-loader?ref=shop-home-active-3.
Unknown Author, AR .223/5.56 speed loader, Mar. 27, 2016, 903plasmaworksdotcom, https://www.etsy.com/listing/286400047/ar-223556-speed-loader?ref=market.
Unknown Author, AR-15 Mag loader, Mar. 27, 2016, JarednCece, https://www.etsy.com/listing/265952088/ar-15-mag-loader?ref=shop-review.
Unknown Author, AR 15 Magazine Speed Loader !!Free Shipping!!, Mar. 27, 2016, RedRockSignworks, https://www.etsy.com/listing/271664006/ar-15-magazine-speed-loader-free?ga-order=most-relevant&ga-search-type=all&ga-view-type=gallery&ga-search-query=ar15%20mag%20loader&ref=sr-gallery-4.
Unknown Author, Handcrafted AR15 Mag loader, Mar. 27, 2016, MountainViewWoodshop, https://www.etsy.com/listing/265031233/handcrafted-ar15-mag-loader-summmer?utm-source=google&utm-medium=cpc&utm-campaign=shopping-us-branded-toys-and-games&utm-custom1=249b116d-2059-4def-a8a8-0eacd6db60d6&gclid=CICc3-CK4csCFcokhgodSmEGLQ.
Unknown Author, (Patent Pending) Mag-Packer, AR15 model, Jul. 13, 2015, Mag Packer, https://www.youtube.com/watch?vr=0JChoITsm90.
Office Action dated Jan. 6, 2015 in U.S. Appl. No. 13/931,953.
Unknown Author, AR-15/ M4 Magazine Loader, Mar. 13, 2014 or earlier, MrLarry0001, https://www.youtube.com/watch?v=AnUk1aNp1PE.
Unknown Author, AR Magazine speed loader, Mar. 29, 2015 or earlier, Double.sub.—MK, https://www.youtube.com/watch?v=vf76iM1E3fk.
Unknown Author, Podavach Multi-Caliber Magazine Loader, Mar. 27, 2016 or earlier, Podavach, http://podavach.com/.
Glockmeister, "Exploded Glock Drawing"—Glockmeister, Master of Perfection, Apr. 17, 2015, https://web.archive.org/web/20150417034813/http://www.glockmeister.com/Ex- plodedGlockDrawing.asp.
Unknown Author, Shop MagPacker Magazine Speed Loaders, Aug. 28, 2015 or earlier, https://www.magpacker.com/MagPacker-AR-15-AK-47-Magazine-Speed-L- oaders/c/1.
Unknown Author, Range Benchloader, Sep. 29, 2015 or earlier, Maglula Ltd., Israel.
Unknown Author, Thunderstruck Loaders, Jan. 4, 2016 or earlier, H & K Enterprises, Inc., http://thunderstruckloaders.com/.
Unknown Author, Lula, Jan. 4, 2016 or earlier, Maglula Ltd., http://www.maglula.com/product-category/rifle-mag-loaders/lula/.

(56) References Cited

OTHER PUBLICATIONS

Unknown Author, Smitload, Apr. 5, 2016 or earlier, Smithshot, http://www.smitshot.com/.
Unknown Author, McFadden Ultimate Clip Loader, Jun. 16, 2011 or earlier, Jarrett Maxwell, https://www.youtube.com/watch?v=nNPWFf5k8Qw.
Unknown Author, Lightnin' Grip Loader, Mar. 3, 2014 or earlier, McFadden Machine, https://www.youtube.com/watch?v=ZxLiUaGZnbw.
Unknown Author, Magazine Loaders for B&T MP9 and HK MP5, Sep. 3, 2015 or earlier, Александр Сергеевич , https://www.youtube.com/watch?v=himrMwJ7gn8.
Unknown Author, So the cats out of the bag., Dec. 23, 2016 or earlier, etsgroup, https://www.instagram.com/p/BOXrixQjfBT/.
Unknown Author, Custom AR-15 Magazine Loader Mar. 27, 2016 or earlier, Buck Shot Sporting Goods, hllps://,www.slickguns.com/producl/custom-ar-15-magazine-loader-wooden-cnc-usa-made-free-ship-no-ccee-150#comments.
Unknown Author, AR-15, 30 Round Magazine Speed Loader, Nov. 26, 2015 or earlier, PopsCabinetShop, hllps://www.etsy.com/listing/239467167 /ar-15-30-round-magazine-speed-loader?ref=shop home_ active_ 3.
Unknown Author, AR .223/5.56 speed loader, Mar. 27, 2016 or earlier, 903plasmaworksdotcom, hllps:/lwww.~tsy.com/listing/286400047/ar-223556-speed-loader?ref=market.
Unknown Author, AR-15 Mag loader, Mar. 27, 2016 or earlier, JarednCece, https:/lwww.etsy.com/isting/265952088/ar-15-mag-loader?ref=shop _review.
Unknown Author, AR 15 Magazine Speed Loader !!Free Shipping!!, Mar. 27, 2016 or earlier, RedRockSignworks, hllps://www.etsy.com/listing/271664006/ar-15-magazine-speed-loader-free?Ua order=most_relevant&ga search_ type=all&ga view_ type=gallery &ga search_ query=ar15%20mag%UQloader&ref=sr_gallery_ 4.
Unknown Author, Handcrafted AR15 Mag loader, Mar. 27, 2016 or earlier, MountainViewWoodshop, hllps://.vww_etsy.com/listing/265031238/handcrafled-ar15-mag-loader-spring-and?utm source=google&utm medium=cpc&utm _ campaign=shopping_ us_ brandedoysand _games&utm custom 1 =249b116d-2059-4def-a8a8-0eacd6db60d6&gclid=ClCc3 _ CK4csCFcokhgodSmEGLC.
Mag Packer. <https://www.youtube.com/watch?v=0JCholTsm90>. Jul. 13, 2015.
Unknown Author, Podavach Loading vs. Manual Loading, Sep. 25, 2015 or earlier, U-Loader by Podavach: AR15 & AK Speed Loader, https://www.youtube.com/watch?v=f5UhR0QZu38.
Unknown Author, Podavach U-Loader Version 3.0 AR-15 & AK Magazine Speed Loader Review, Jan. 17, 2016 or earlier, U-Loader by Podavach: AR15 & AK Speed Loader, https://www.youtube.com/watch?v=Qmbb4r9g9Sg.
Unknown Author, Multi-caliber AK, AR-15 Magazine Speed Loader—Podavach Version 5.4, Feb. 20, 2016 or earlier, U-Loader by Podavach: AR15 & AK Speed Loader, https://www.youtube.com/watch?v=IrTmkNJmuXo.
Unknown Author, U-Loader by Podavach: Podavach Version 5.4—Multi-Platform Magazine Speed Loader for AK & AR15, Mar. 20, 2016 or earlier, U-Loader by Podavach: AR15 & AK Speed Loader, https://www.youtube.com/watch?v=-UROVSuPfHs.
Unknown Author, Podavach Mag loader v5.4, Apr. 1, 2016 or earlier, darink300zx, https://www.youtube.com/watch?v=_zw4iTiuv1s.
Ray I, SmitLoad Glock Mag Loader, Apr. 21, 2016 or earlier, The Firearm Blog, https://www.thefirearmblog.com/blog/2016/04/21/225273/.
Unknown Author, SmitShot has a brand new speed loader!! Available for Glock 9mm soon. Keep posted for all other upcoming models!, Sep. 14, 2016, or earlier, Instagram, https://www.instagram.com/p/BKW2gjmgn4d/.
Unknown Author, How a Mannlicher M1905 works, Nov. 19, 2017, or earlier, Si vis pacem , para bellum., https://www.youtube.com/watch?v=Ob820VDgPQE.
Unknown Author, Small Arms of WWI Primer 026: Austro-Hungarian Roth-Krnka M.7 Pistol, May 24, 2016, or earlier, C&Rsenal., https://www.youtube.com/watch?v=MQTexxPSszU.
Unknown Author, Strip Lula. Can Loading AR Mags be Easier Than This?, Jun. 27, 2014, or earlier, beelikestowatch, https://www.youtube.com/watch?v=5zTUdk4ZF8Y.

* cited by examiner

MAGAZINE LOADER

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

RELATED DOCUMENTS

This application is related to, incorporates by reference in their entireties, and claims the priority benefits of the following documents: (1) U.S. patent application Ser. No. 15/294,770, entitled "Magazine Loader," and filed on Oct. 16, 2016 by Christopher Andrew Plate, which incorporated by reference and claimed the priority benefit of U.S. patent application Ser. No. 14/979,051, now U.S. Pat. No. 9,618,286, which incorporated by reference and claimed the priority benefit of U.S. patent application Ser. No. 14/869,502 entitled "Ammunition Magazine Loader" and filed on Sep. 29, 2015 by Christopher Andrew Plate; (2) U.S. Provisional Patent Application Ser. No. 62/473,994, entitled "Pistol Loader, Method, and System" and filed on Mar. 20, 2017 by Christopher Andrew Plate; and (3) U.S. Provisional Patent Application Ser. No. 62/478,090, entitled "Another Pistol Loader, Method, and System" and filed on Mar. 29, 2017 by Christopher Andrew Plate.

FIELD OF THE INVENTION

The present invention relates to ammunition magazines, and more specifically, to ammunition magazines loaders.

BACKGROUND OF THE INVENTION

A magazine is a device used to provide rounds of ammunition to a firearm. An ammunition magazine loader is a device to facilitate the loading of rounds into an ammunition magazine.

SUMMARY OF THE INVENTION

It is an object of the present invention to provide an ammunition magazine loader, and method of using the same.

It is another object of the present invention to provide an ammunition magazine loader and method of using the same that overcomes at least one deficiency in the prior art.

In an exemplary embodiment of the present invention, an ammunition magazine loader can be configured to load one or more ammunition rounds into a magazine having a magazine shape, with each round including first and second case ends and a pivot point. Such an ammunition magazine loader can include a main body, a rounds recess, a rounds abutment, and a magazine recess.

In an exemplary aspect of the invention, a main body can include a first main body end, a second main body end, and a main body length.

In another exemplary aspect of the invention, a rounds recess can extend along the main body length, and can have first and second rounds recess ends, a rounds recess bottom, first and second rounds recess sides, and first and second rounds recess ledges. The rounds recess bottom, first rounds recess side, and first rounds recess ledge can define a first case cavity between the rounds recess bottom and the first rounds recess ledge; and the rounds recess bottom, second rounds recess side, and second rounds recess ledge can define a second case cavity between the rounds recess bottom and the second rounds recess ledge. Further, a rounds recess can be shaped to hold the plurality of rounds therein with the first case ends positioned within the first case cavity and under the first rounds recess ledge and with the second case ends positioned within the second case cavity and under the second rounds recess ledge, with the first and second ledges acting as respective abutments holding the rounds in place against the rounds recess bottom.

In another exemplary aspect of the present invention, a rounds abutment can be connected to the loader, and can be at least partially positioned within the rounds recess and at the first rounds recess end.

In a further exemplary aspect of the invention, a magazine recess can be positioned at the first main body end, and optionally, can have a magazine recess length that is less than the magazine length, which obviates the need to accommodate the full length of the magazine into the main body length and/or can allow a wider range of different lengthed magazines to function with the invention. Further, the magazine recess can be complementarily shaped to the magazine shape to retain the magazine in a fixed position within said magazine recess.

In still another exemplary aspect of the invention, the second rounds recess end can be positioned at the second main body end, and can be shaped to compatibly accept each round into said rounds recess; and the first rounds recess end can open into said magazine recess, such that when a magazine is operatively positioned within said magazine recess and the at least one round is slidably moved out of said rounds recess through the first rounds recess end, the pivot point of the one or more rounds contacts said rounds abutment to angle the second case end of each respective round towards said magazine recess.

In a further exemplary aspect of the present invention, a rounds abutment can be provided as at least one of a separate structure and an extension of any desired portion of loader 100, such as, for example and not in limitation, an inwardly curved first rounds recess side.

In an optional exemplary aspect of the invention, when the one or more rounds are positioned within said rounds recess, each of the first case ends can be positioned between the first rounds recess ledge and the rounds recess bottom and/or each of the second case ends can be positioned between the first rounds recess ledge and the rounds recess bottom, with the former alleviating any potential stresses arising from the first rounds recess ledge against a projectile extending from a first case end.

In another optional exemplary aspect of the invention, the magazine recess can include a magazine recess bottom having at least one of a magazine retention depression and a magazine retention abutment, with one or both facilitating the static positioning of a magazine during loading.

In still another exemplary aspect of the invention, one of the at least one round can be a blank round, and another of the at least one round can be an active round.

In another exemplary embodiment of the invention, an ammunition magazine loader can further include a rounds retention recess. Such a recess can extend into said main body from the upper surface, can be positioned at the second main body end, and can open into the second rounds recess end, such that one or more of the plurality of rounds can be moved from said rounds retention recess to said rounds recess via the second rounds recess end.

An exemplary method of using an ammunition loader to load an ammunition magazine can include (a) positioning the magazine within the magazine recess; (b) introducing the rounds into the rounds recess; (c) pushing the rounds towards and into the magazine via a last round, such that as the rounds are slidably moved out of the rounds recess through the second rounds recess end, the pivot point of each round contacts the rounds abutment to angle each second case end towards the magazine recess, and when an exiting round exits the rounds recess, the exiting round abuts and forces at least one of the follower and a pre-loaded round in the magazine downwardly into the magazine against the spring force as the exiting round enters the magazine.

These and other exemplary aspects and embodiments of the present invention are further described herein.

DETAILED DESCRIPTION

Figure 1A:
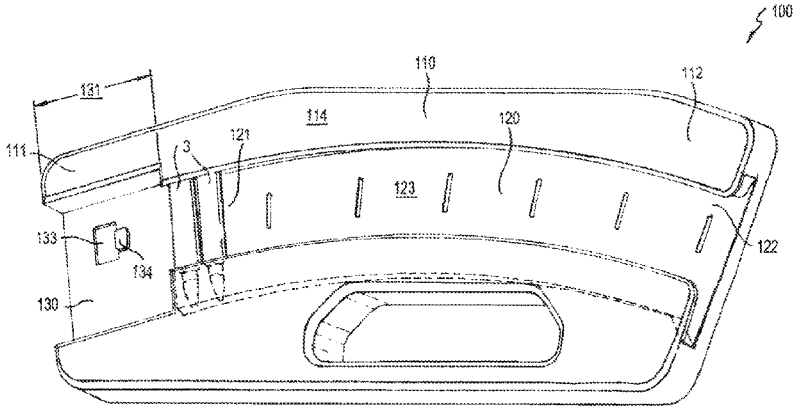
FIG. 1a illustrates an exemplary ammunition magazine loader according to the present invention, in which a loader includes a main body, a rounds recess, and a magazine recess.

It should be noted that this disclosure includes a plurality of embodiments, with a plurality of elements and aspects, and such elements and aspects need not necessarily be interpreted as being conjunctively required by one or more embodiments of the present invention. Rather, all combinations of the one or more elements and/or aspects can enable a separate embodiment of the present invention, which may be claimed with particularity in this or any one or more future filed Non-Provisional Patent Applications. Moreover, any particular materials, structures, and/or sizes disclosed herein, whether expressly or implicitly, are to be construed strictly as illustrative and enabling, and not necessarily limiting. Therefore, it is expressly set forth that such materials, structures, and/or sizes independently or in any combination of one of more thereof, are merely illustratively representative of one or more embodiments of the present invention and are not to be construed as necessary in a strict sense.

Further, to the extent the same element or aspect is defined differently within this disclosure, whether expressly or implicitly, the broader definition is to take absolute precedence, with the distinctions encompassed by the narrower definition to be strictly construed as optional.

Illustratively, perceived benefits of the present invention can include functional utility, whether expressly or implicitly stated herein, or apparent herefrom. However, it is expressly set forth that these benefits are not intended as exclusive. Therefore, any explicit, implicit, or apparent benefit from the disclosure herein is expressly deemed as applicable to the present invention.

According to the present invention, an ammunition magazine loader can be formed from any one or more materials or combinations of materials, such as one or more of plastic, rubber, wood, metal, a crystalline material, or any other man-made or naturally occurring material, for example and not in limitation, insofar as the same if functionally consistent with the invention as described. Further, a loader can be manufactured in any one or more functionally compatible manners, such as through molding, machining, etc.

FIGS. 1a-2b illustrate exemplary embodiments of the present invention, in which an ammunition magazine loader 100 can be configured to load a plurality of ammunition rounds 3 into a magazine 1 having a magazine shape, such as a straight or curved parallelepiped for example and not in limitation, and a magazine length 2.

In an exemplary aspect, a round 3 can include a first case end 4 and a second case end 5. Notably, rounds 3 can include one or more live rounds and/or one or more blank rounds.

Figure 1B:
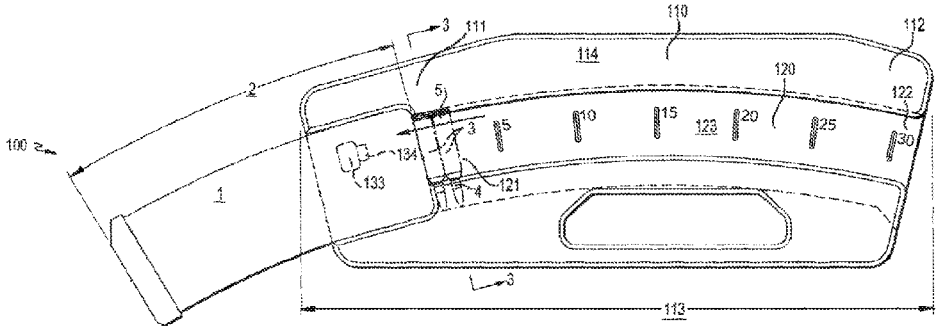
FIG. 1b illustrates such an exemplary ammunition magazine loader with an exemplary magazine positioned within the magazine recess.
Figure 2A:
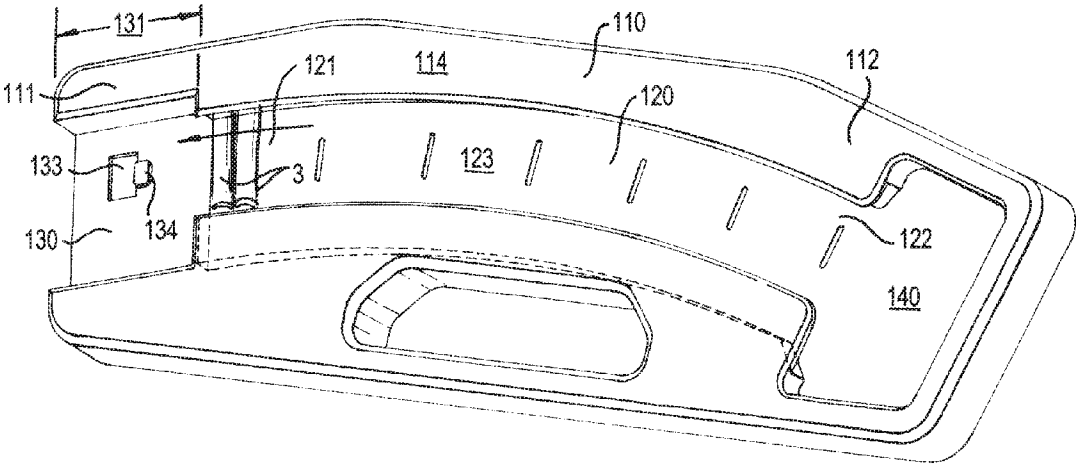
FIG. 2a illustrates an exemplary ammunition magazine loader according to the present invention, in which a loader includes a main body, a rounds recess, a magazine recess, and an optional rounds retention recess.
Figure 2B:
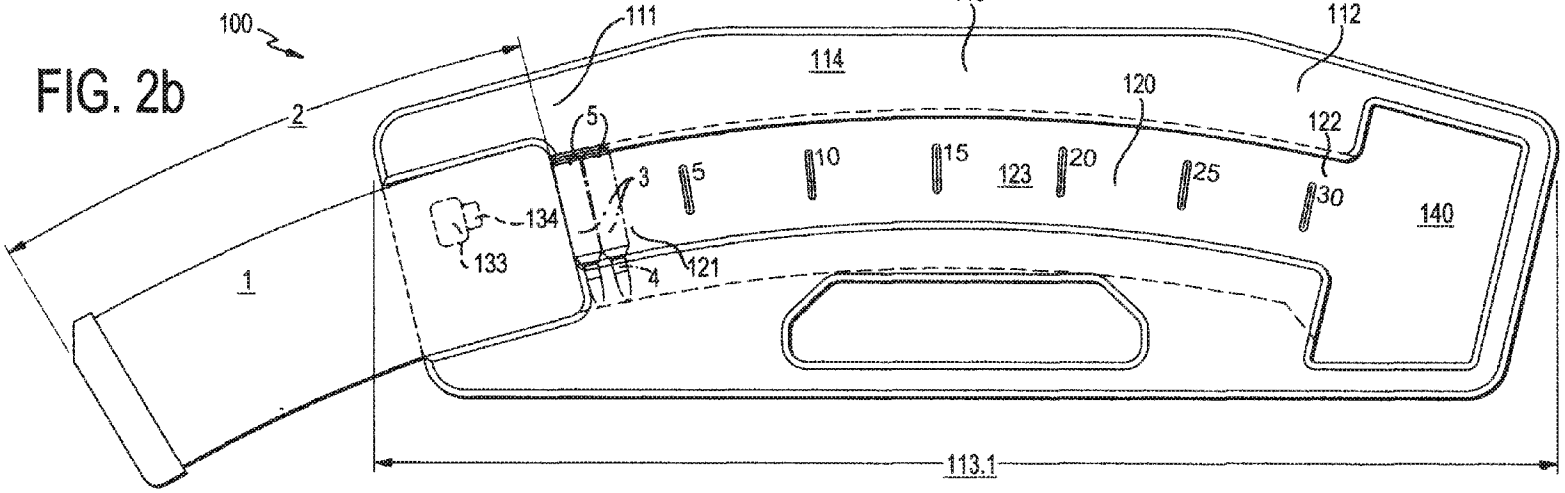
FIG. 2b illustrates such an exemplary ammunition magazine loader having an optional rounds retention recess, and with an exemplary magazine positioned within the magazine recess.

FIGS. 1a and 1b illustrate an exemplary loader 100 having a main body 110, a rounds recess 120, and a magazine recess 130; whilst FIGS. 2a and 2b illustrate another exemplary embodiment of the present invention, in which loader 100 can further include an optional rounds retention recess 140.

As illustratively shown in FIGS. 1a-2b, main body 110 can include a first main body end 111, a second main body end 112, a main body length 113, and an upper surface 114.

As further illustratively shown, rounds recess 120 extends into main body 100 along main body length 113 and from upper surface 114, and can include a first rounds recess end 121, a second rounds recess end 122, a rounds recess bottom 123, a first rounds recess side 124, a second rounds recess side 125, a first rounds recess ledge 126, and a second rounds recess ledge 127.

Figure 3A:
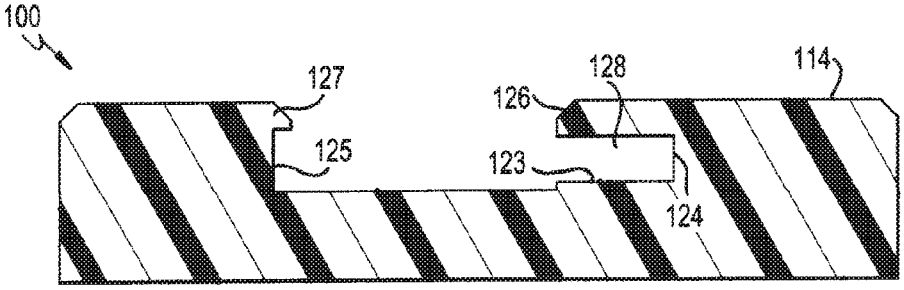
FIG. 3a illustrates a cross-section view of an exemplary rounds recess.

As illustrated in FIG. 3a, rounds recess bottom 123, first rounds recess side 124, and first rounds recess ledge 126 cooperatively define a first case cavity 128 positioned, at least partially, between the rounds recess bottom and the first rounds recess ledge; and rounds recess bottom 123, second rounds recess side 125, and second rounds recess ledge 127 define a second case cavity 129 positioned at least partially between the rounds recess bottom and the second rounds recess ledge.

As further illustrated in FIG. 3a, rounds recess 120 can be complementarily shaped to rounds 3 to allow the rounds to slidably move within at least a portion of the rounds recess and to exit through first rounds recess end 122. Notably, rounds 3 can be introduced into rounds recess 120 via at least one of first rounds recess end 121, second rounds recess end 122, and any portion therebetween, all of which are deemed equivalents to the extent functionally compatible. Further notably, rounds recess 120 can be provided with any functionally compatible shape, and accordingly, any bottom or side described herein can include any combination of one or more linear and/or curvilinear shapes, including any contiguous positioned side, sides, and/or bottom being similarly, dissimilarly, or identically curvilinear.

Figure 3B:
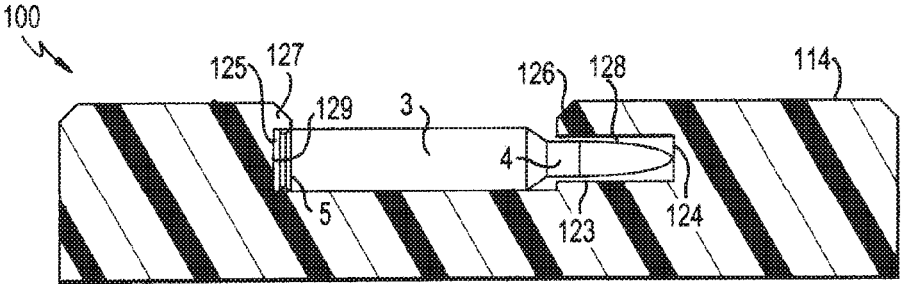
FIG. 3b illustrates a cross-section view of an exemplary rounds recess having a live round positioned therein.
Figure 3C:
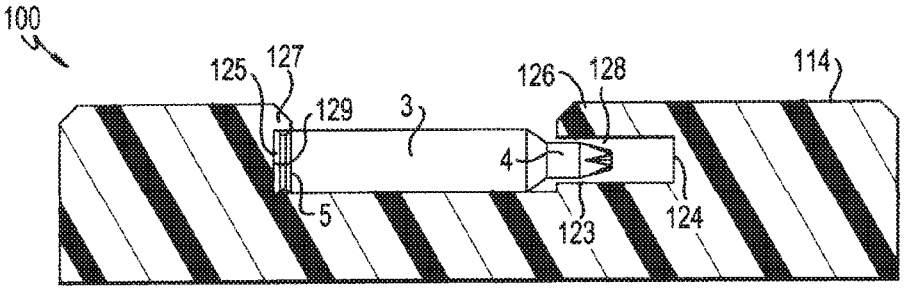
FIG. 3c illustrates an exemplary rounds recess having a blank round positioned therein.
Figure 4:
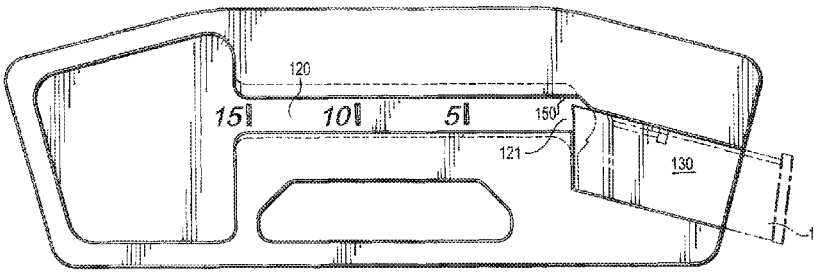
FIG. 4 illustrates an exemplary loader having a rounds abutment.

As illustrated in FIGS. 3b and 3c, with rounds 3 held within rounds recess 120, each first case end 4 can be positioned within first case cavity 128 and under first rounds recess ledge 126 and each second case end 5 can be positioned within second case cavity 129 and under second rounds recess ledge 127. It should be noted, however, that to the extent desired and functionally compatible, loader 100 can be configured to toggle such arrangement such that first and second case ends 4, 5 can be positioned in association with second and first case cavities 129, 128, respectively.

As illustrated in FIG. 1a-2b, loader 100 further includes a magazine recess 130 that extends into main body 110 from upper surface 114, and can be positioned at first main body end 111. As shown, magazine recess 130 includes a magazine recess length 131 that is less than magazine length 2. Accordingly, in an exemplary aspect, the present invention is not limited to a maximum-lengthed magazine, which can arise when a magazine recess is configured to encapsulate the entire length of a magazine. Further, in another exemplary aspect, due to the length consideration above, main body length 113 can be reduced, as the main body length does not require inclusion of the full length of a magazine, rendering the overall length of the invention less and therefore more conveniently transportable and/or storable.

As further illustrated, magazine recess 130 can be complementarily shaped to the shape of magazine 1 so as to facilitate retention of the magazine in a fixed position within the magazine recess during loading. Accordingly, retention can be effectuated via a friction fit between magazine 1 and a portion of main body 110 that defines magazine recess 130. Further, alternatively or in combination, retention can be facilitated with at least one of a magazine retention depression 133 and a magazine retention abutment 134, which can retentionally engage a compatibly configured portion of magazine 1.

Also illustrated, second rounds recess end 122 can be positioned at second main body end 112 and shaped to accept each round 3 into rounds recess 120. Accordingly, as first rounds recess end 121 opens into magazine recess 130, when magazine 1 is positioned within the magazine recess, rounds 3 can be slidably moved out of rounds recess 120 through the first rounds recess end and into magazine 1. For example and not in limitation, a user can utilize their finger or any other desired structure that fits within at least a portion of rounds recess 120 to push at least one round 3 towards magazine 1, such that the at least one round, and any other rounds between that round and the first rounds recess end 121, slidably moves out of the rounds recess, through the first rounds recess end, and into the magazine.

FIGS. 4-6b illustrate additional exemplary embodiments of the present invention that can accommodate loading of a single feed magazine, in which loader 100 can optionally include a rounds abutment 150, which causes rounds 3 to pivot as the rounds exit rounds recess 120 such that each exiting round is oriented with its respective second case end 5 being angled towards magazine recess 130.

In an exemplary aspect of the present invention, rounds abutment 150 can be provided as any one or more desired shapes and/or sizes to the extent the rounds abutment is positioned, at least in part, within rounds recess 120 and at first rounds recess end 121, so as to function as a pivoting structure as described herein. Notably, being positioned at first rounds recess end 121 is intended to include being positioned within and/or outside of rounds recess 120, insofar as a functionally compatible pivoting function is achieved. In another exemplary aspect, rounds abutment 150 can be connected to any one or more desired portions of loader 100, including, but not limited to, upper surface 114, first rounds recess ledge 126, first rounds recess side 124, and rounds recess bottom 123 (see FIGS. 3a-3c for the exemplary [potions] *portions* listed). In an exemplary aspect, in any of the embodiments herein, rounds abutment 150 can be provided as at least one of a separate structure (as illustratively shown in FIGS. 4 and 5b as a post) and an extension of any desired portion of loader 100 (illustratively shown in FIG. 5a as an inwardly curved first rounds recess side 124). In any of such cases, rounds abutment 150 can be configured to abut one or more of rounds 3 at a pivot point 6 of the one or more rounds, which causes the one or more rounds to pivot with second case end 5 being angled towards magazine recess 130, which as noted above accommodates single feed magazines. Notably, a pivot point 6 according to the present invention can be any point along a round 3 that causes a pivoting of the round as described herein.

Figure 5A:
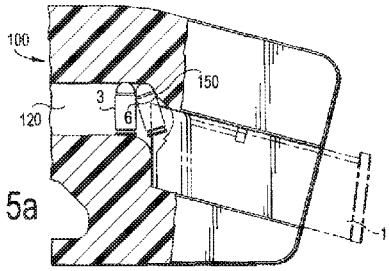
FIG. 5a illustrates an exemplary rounds abutment provided as a portion of an exemplary first rounds recess side that is inwardly curved.

In another exemplary aspect, as illustratively shown in FIG. 5a, loader 100 can further optionally include an outwardly curved second rounds recess side 125 to facilitate exiting of rounds 3 from rounds recess 120 and into magazine 1.

Figure 5B:
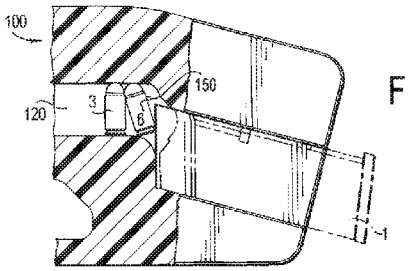
FIG. 5b illustrates an exemplary rounds abutment provided as a post.
Figure 5C:
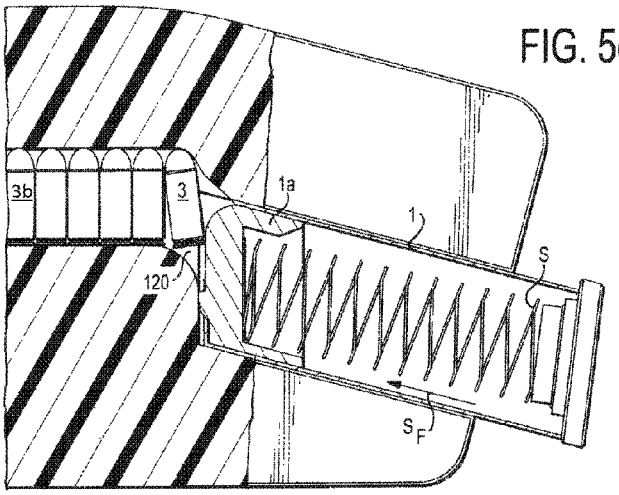
FIG. 5c illustrates an exemplary empty magazine being loaded with a round that abuts and forces a follower downwardly against a spring force as the round enters the magazine.
Figure 5D:
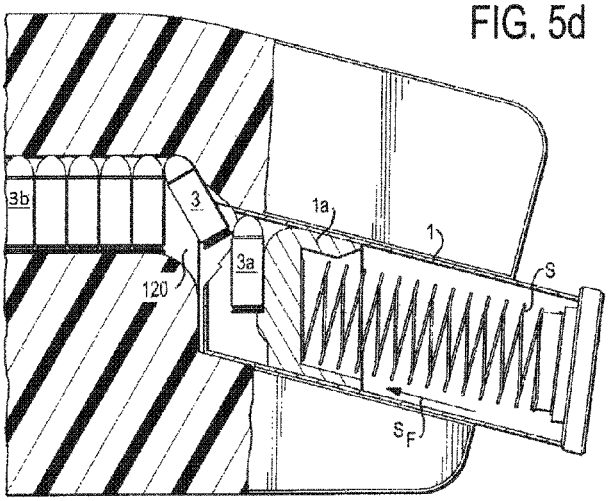
FIG. 5d illustrates an exemplary magazine having a pre-loaded round being loaded with another round that abuts and forces the pre-loaded round and a follower downwardly against a spring force as the other round enters the magazine.
Figure 5E:
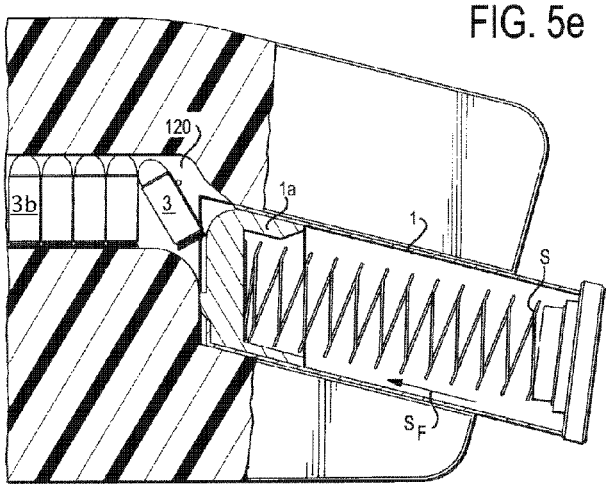
FIG. 5e illustrates an exemplary empty magazine being loaded with a round that abuts and forces a follower downwardly against a spring force as the round enters the magazine.
Figure 5F:
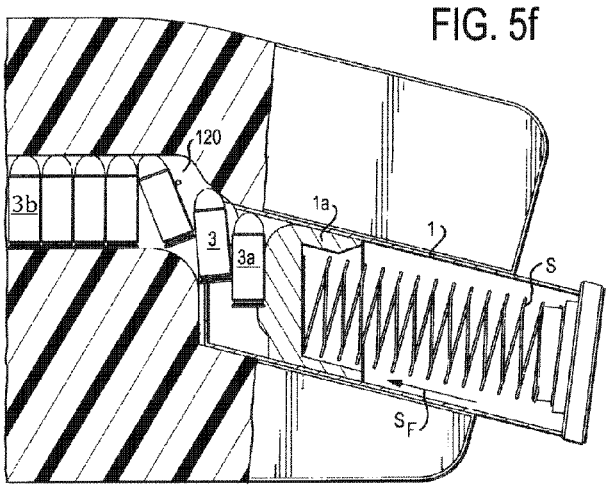
FIG. 5f illustrates an exemplary magazine having a pre-loaded round being loaded with another round that abuts and forces the pre-loaded round and a follower downwardly against a spring force as the other round enters the magazine.
Figure 6:
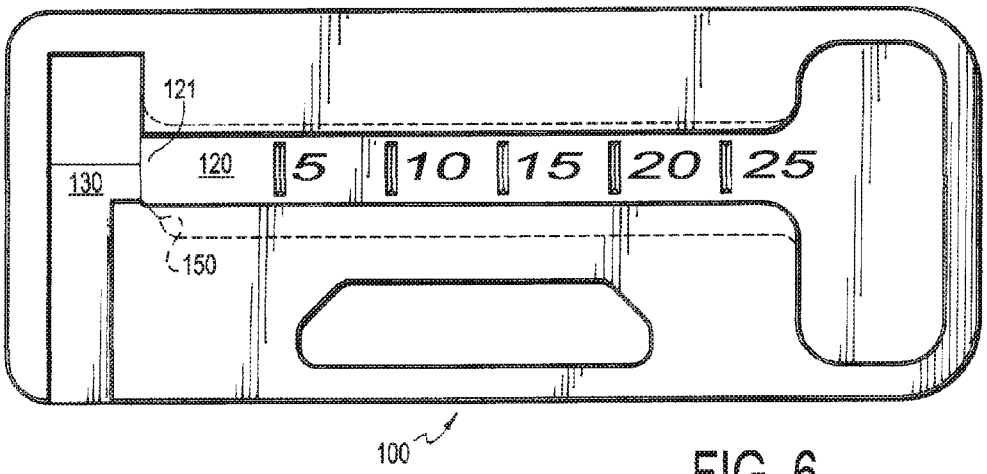
FIG. 6 illustrates an exemplary loader configured for loading an exemplary magazine.
Figure 6A:
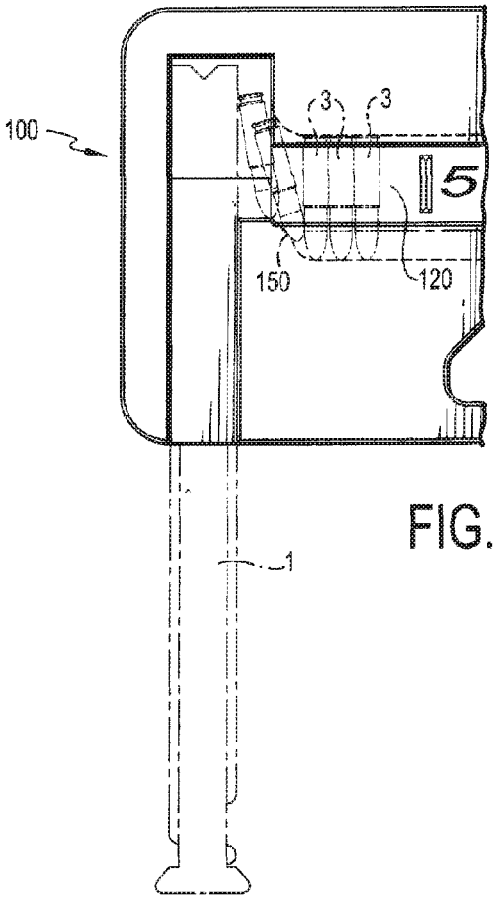
FIG. 6a illustrates an exemplary loader with exemplary rounds pivoting about a portion of an exemplary first rounds recess side that is inwardly curved.

FIGS. 5a and 5b illustratively show loader 100 being configured to load a common single feed magazine, which can be, for example and not in limitation, a GLOCK™ compatible magazine; whilst FIGS. 6 and 6a illustratively show a loader being configured to load a P90™ magazine.

As illustrated in FIGS. 5c-5f, when a last round 3b is moved towards magazine recess 130 and an exiting round 3 exits rounds recess 120, the exiting round abuts and forces at least one of the follower 1a and a pre-loaded round 3a in magazine 1 downwardly into the magazine against the spring force $S_F$ provided by spring S as the exiting round enters the magazine.

Figure 7:
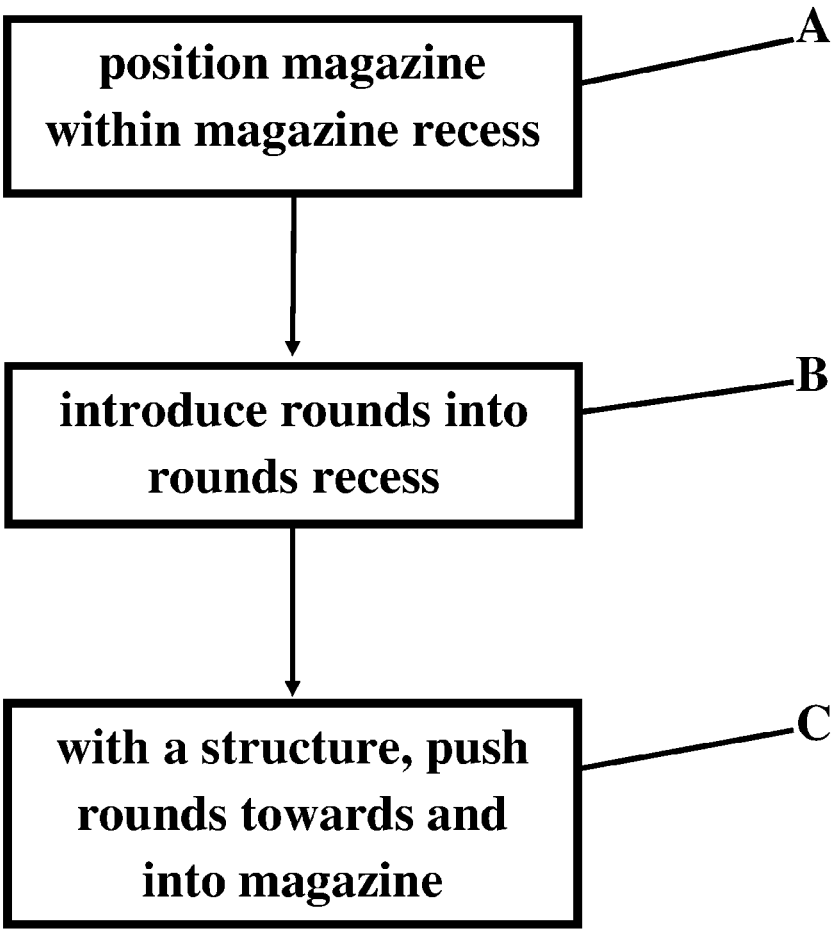
FIG. 7 illustrates exemplary method steps of loading an ammunition magazine with a magazine loader.

As illustrated in FIG. 7, an exemplary method of using an ammunition magazine loader to load ammunition rounds into an ammunition magazine can include (Step A): positioning the magazine within the magazine recess; (Step B): introducing the rounds into the rounds recess; and (Step C): with a structure, pushing the rounds towards and into the magazine via a last round, such that as the rounds are slidably moved out of the rounds recess through the second rounds recess end, the pivot point of each round contacts the rounds abutment to angle each second case end towards the magazine recess, and when an exiting round exits the rounds recess, the exiting round abuts and forces at least one of the follower and a pre-loaded round in the magazine downwardly into the magazine against the spring force as the exiting round enters the magazine.

It will be apparent to one of ordinary skill in the art that the manner of making and using the claimed invention has been adequately disclosed in the above-written description of the exemplary embodiments and aspects.

It should be understood, however, that the invention is not necessarily limited to the specific embodiments, aspects, arrangement, and components shown and described above, but may be susceptible to numerous variations within the scope of the invention. For example, while the present invention is illustratively shown used with a curved magazine, loader 100 can be configured for use with any shaped magazine, including straight, curved, etc. Further, rounds recess 120 is generally shown to be linear along the main body length 113, however, can be provided with any functionally compatible shape or shapes to the extent desired.

Therefore, the specification and drawings are to be regarded in an illustrative and enabling, rather than a restrictive, sense.

Accordingly, it will be understood that the above description of the embodiments of the present invention are susceptible to various modifications, changes, and adaptations, and the same are intended to be comprehended within the meaning and range of equivalents of the appended claims.

Therefore, I claim:

1. A method of using an ammunition magazine loader to load a plurality of ammunition rounds into an ammunition magazine having a follower, a spring providing a spring force biasing the follower upwardly, and a magazine shape, with each round respectively including first and second case ends and a pivot point, and with the magazine loader comprising a main body having a first main body end, a second main body end, and a main body length, a rounds recess, extending along the main body length, and having first and second rounds recess ends, a rounds recess bottom, first and second rounds recess sides, and first and second rounds recess ledges, with the rounds recess bottom, first rounds recess side, and first rounds recess ledge defining a first rounds cavity between the rounds recess bottom and the first rounds recess ledge, with the rounds recess bottom, second rounds recess side, and second rounds recess ledge defining a second rounds cavity between the rounds recess bottom and the second rounds recess ledge, the rounds recess being shaped to hold the rounds therein with each first case end positioned within the first rounds cavity and under the first rounds recess ledge and with each second case end positioned within the second rounds cavity and under the second rounds recess ledge, the second rounds recess end being positioned at the second main body end, and at least a portion of the rounds recess being shaped to accept each round into the rounds recess, a rounds abutment, connected to the loader, and at least partially positioned within the rounds recess and at the first rounds recess end, a magazine recess, in communication with the rounds recess, and positioned at the first main body end, the magazine recess being complementarily shaped to the magazine shape to retain the magazine in a fixed position within the magazine recess and the first rounds recess end opens into the magazine recess, said method comprising:

a. positioning the magazine within the magazine recess;

b. introducing the rounds into the rounds recess; and c. with a structure, pushing the rounds, via a last round, towards and into the magazine, such that as the rounds are slidably moved out of the rounds recess through the [second] *first* rounds recess end, the pivot point of each round contacts the rounds abutment to angle each second case end towards the magazine recess, and when an exiting round exits the rounds recess, the exiting round abuts and forces at least one of the follower and a pre-loaded round in the magazine downwardly into the magazine against the spring force as the exiting round enters the magazine.

2. The method of claim 1, wherein each round is positioned within the rounds recess, and each first case end is positioned between the first rounds recess ledge and the rounds recess bottom.

3. The method of claim 1, wherein each round is positioned within the rounds recess, and each second case end is positioned between the second rounds recess ledge and the rounds recess bottom.

4. The method of claim 3, wherein each round is positioned within the rounds recess, and each first case end is positioned between the first rounds recess ledge and the rounds recess bottom.

5. The method of claim 1, wherein the magazine recess includes a magazine recess bottom having at least one of a magazine retention depression and a magazine retention abutment.

6. The method of claim 1, wherein the magazine loader further comprises a rounds retention recess, extending into the main body from the upper surface, positioned at the second main body end, and opening into the second rounds recess end, such that one or more of the rounds are moveable the rounds retention recess to the second rounds recess end.

7. The method of claim 1, wherein one of the rounds is a blank round, and another of the rounds is an active round.

8. The method of claim 1, wherein the magazine has a magazine length, and the magazine recess has a magazine recess length less than the magazine length.

9. The method of claim 8, wherein each round is positioned within the rounds recess, and each first case end is positioned between the first rounds recess ledge and the rounds recess bottom.

10. The method of claim 8, wherein each round is positioned within the rounds recess, and each second case end is positioned between the second rounds recess ledge and the rounds recess bottom.

11. The method of claim 10, wherein each round is positioned within the rounds recess, and each first case end is positioned between the first rounds recess ledge and the rounds recess bottom.

12. The method of claim 8, wherein the magazine recess includes a magazine recess bottom having at least one of a magazine retention depression and a magazine retention abutment.

13. The method of claim 8, wherein the magazine loader further comprises a rounds retention recess, extending into the main body from the upper surface, positioned at the second main body end, and opening into the second rounds recess end, such that one or more of the rounds is moveable from the rounds retention recess to the second rounds recess end.

14. The method of claim 8, wherein one of the rounds is a blank round, and another of the rounds is an active round.

15. The method of claim 1, wherein the first rounds recess side includes an inwardly curved shape that provides the rounds abutment.

16. The method of claim 15, wherein each round is positioned within the rounds recess, and each first case end is positioned between the first rounds recess ledge and the rounds recess bottom.

17. The method of claim 15, wherein each round is positioned within the rounds recess, and each second case end is positioned between the second rounds recess ledge and the rounds recess bottom.

18. The method of claim 17, wherein each round is positioned within the rounds recess, and each first case end is positioned between the first rounds recess ledge and the rounds recess bottom.

19. The method of claim 15, wherein the magazine recess includes a magazine recess bottom having at least one of a magazine retention depression and a magazine retention abutment.

20. The method of claim 15, wherein the magazine loader further comprises a rounds retention recess, formed within the main body from the upper surface, positioned at the second main body end, and opening into the second rounds recess end, such that one or more of the at least one round is moveable from the rounds retention recess to the second rounds recess end.

21. The method of claim 15, wherein one of the rounds is a blank round, and another of the rounds is an active round.

* * * * *